Oct. 21, 1969  E. J. SCHWEITZER  3,473,878
REFLECTION HEAD FOR MEASURING DIFFUSE REFLECTION DENSITY
Filed Nov. 14, 1966  3 Sheets-Sheet 1
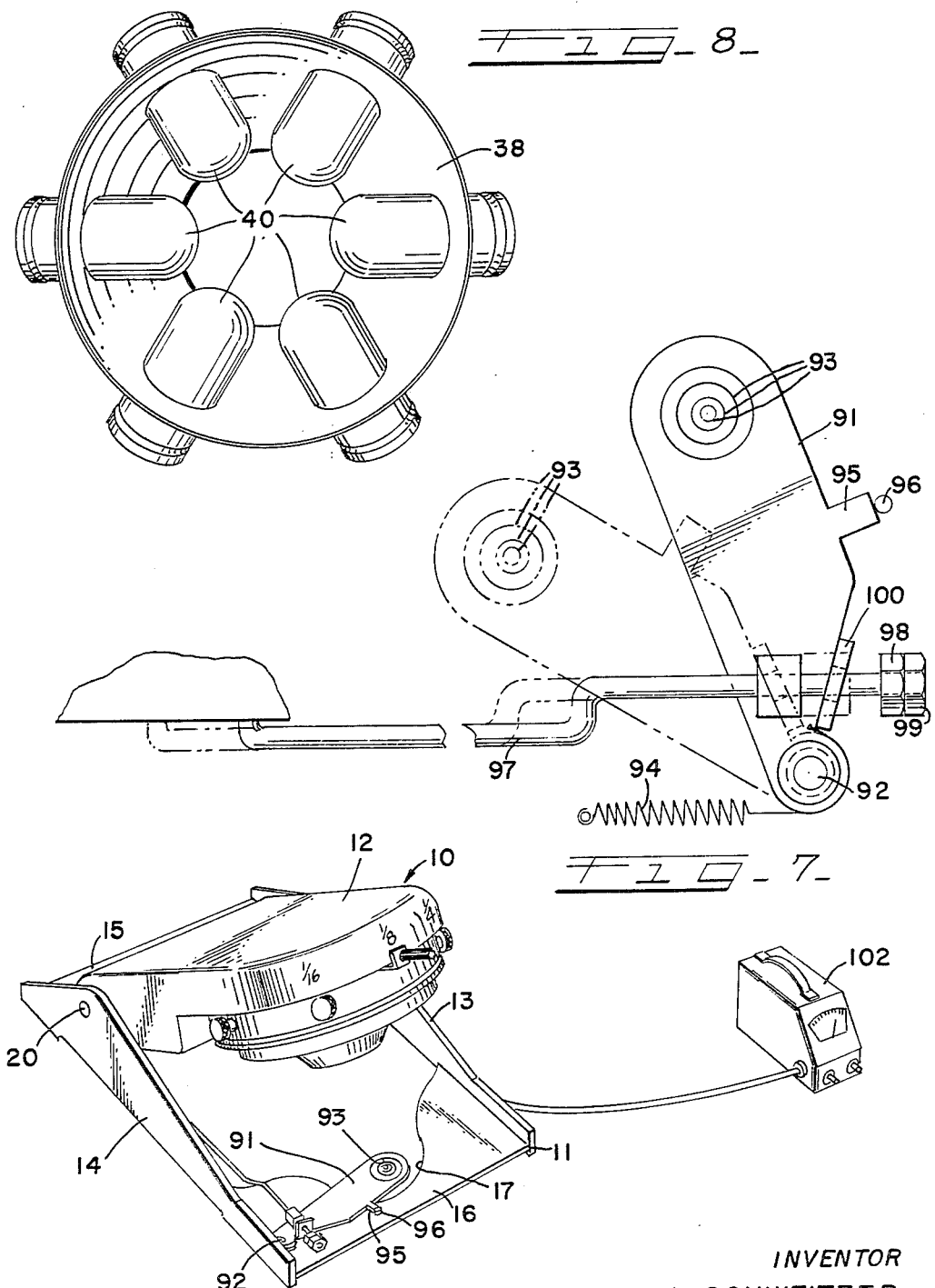
INVENTOR
ERICH J. SCHWEITZER
BY Greist, Lockwood,
Greenawalt & Dewey ATT'YS.

Oct. 21, 1969     E. J. SCHWEITZER     3,473,878
REFLECTION HEAD FOR MEASURING DIFFUSE REFLECTION DENSITY
Filed Nov. 14, 1966     3 Sheets-Sheet 2
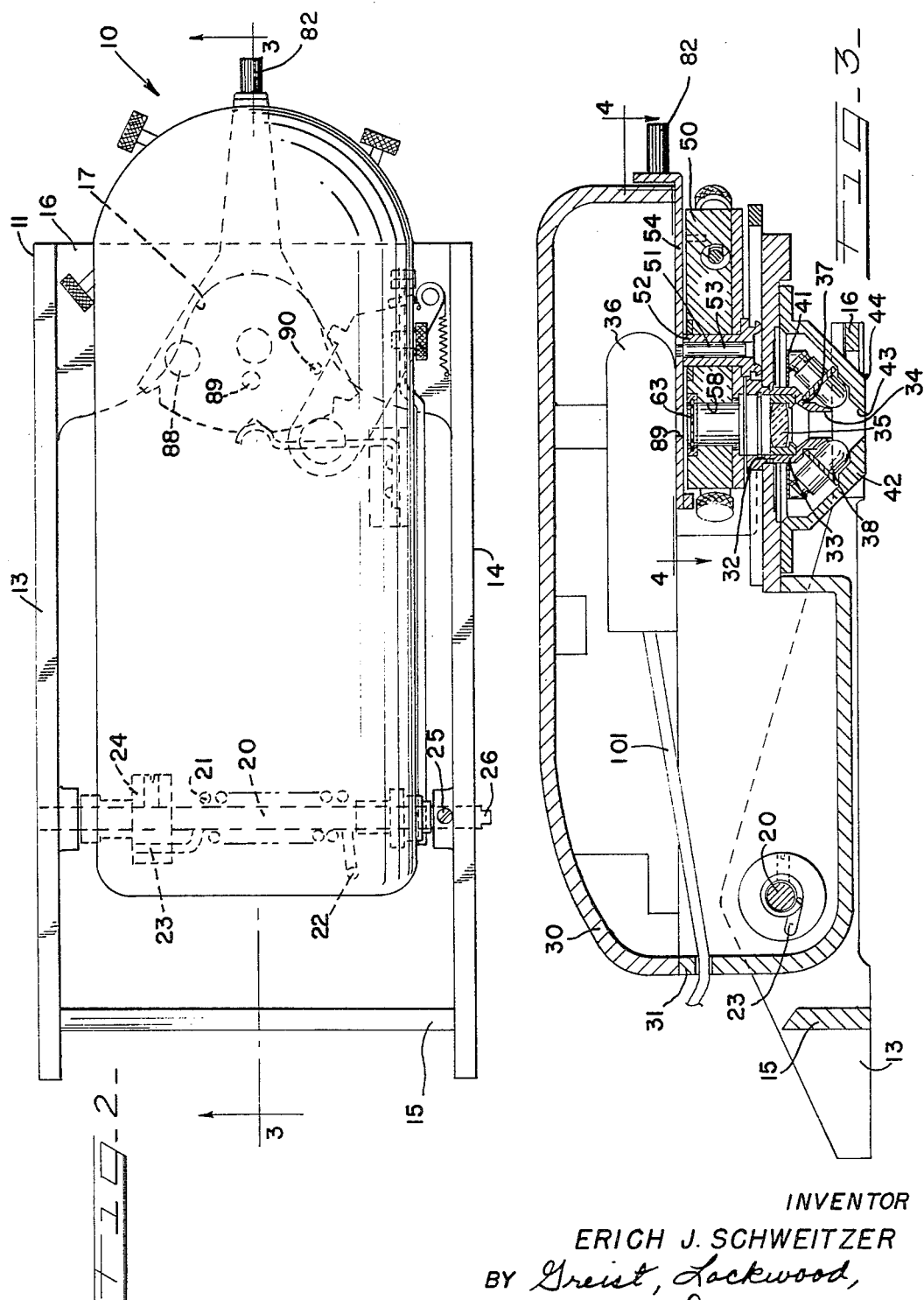
INVENTOR
ERICH J. SCHWEITZER
BY Greist, Lockwood,
Greenawalt & Dewey ATT'YS.

Oct. 21, 1969     E. J. SCHWEITZER     3,473,878
REFLECTION HEAD FOR MEASURING DIFFUSE REFLECTION DENSITY
Filed Nov. 14, 1966     3 Sheets-Sheet 3
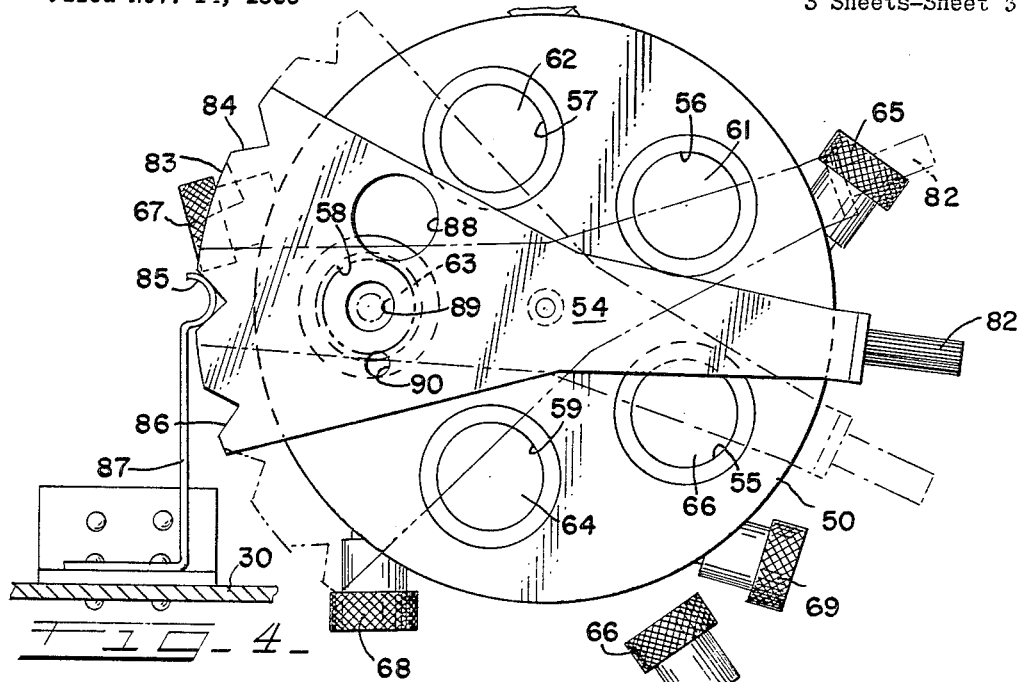
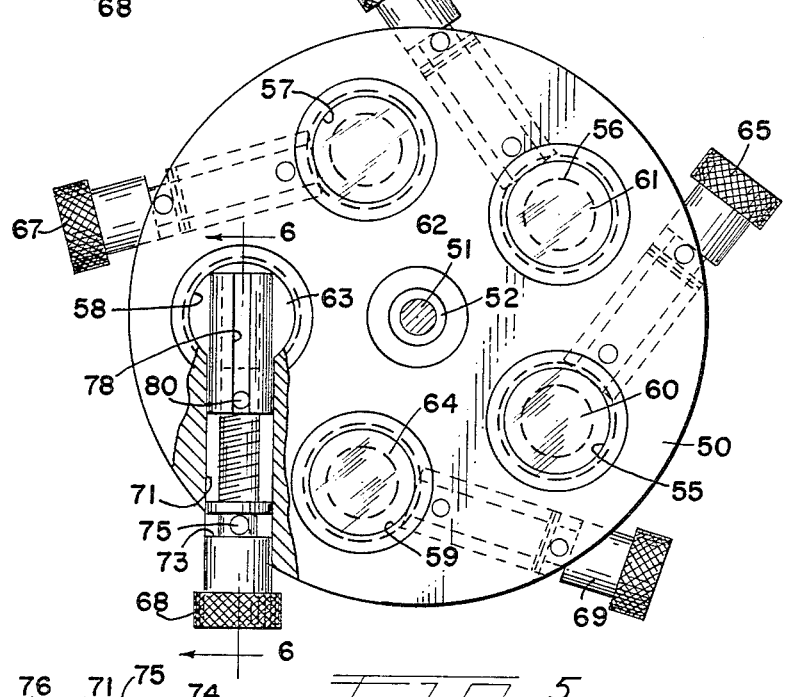
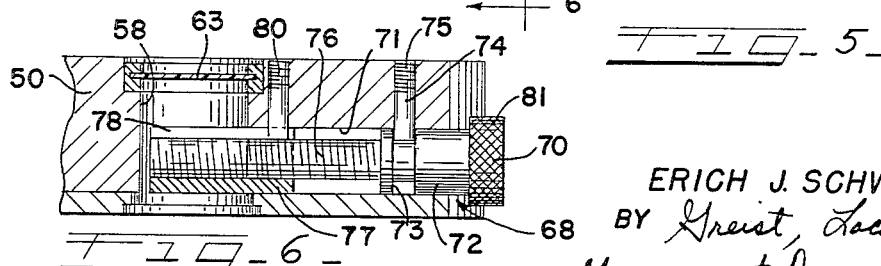
INVENTOR
ERICH J. SCHWEITZER
BY Greist, Lockwood,
Greenawalt & Dewey ATT'YS.

3,473,878
Patented Oct. 21, 1969

3,473,878
REFLECTION HEAD FOR MEASURING DIFFUSE REFLECTION DENSITY

Erich J. Schweitzer, Niles, Ill., assignor to The Welch Scientific Company, Skokie, Ill., a corporation of Illinois
Filed Nov. 14, 1966, Ser. No. 593,819
Int. Cl. G01n 21/48
U.S. Cl. 356—210         11 Claims

ABSTRACT OF THE DISCLOSURE

A reflection head for measuring diffuse reflection density. The reflection head is equipped with a plurality of lamps arranged in a 360° pattern.

---

This invention relates to a new and improved reflection head particularly adapated for use in the measurement of diffuse reflection density.

Diffuse reflection density is attained by irradiating the surface of the sample under consideration at an angle of approximately 45° to an axis perpendicular to its surface. Only the radiation which is diffused along a path normal to the surface is collected while the specular component, which is reflected at an angle equal to the angle of incidence, is allowed to scatter and/or dissipate.

Diffuse reflection density is of particular interest in the field of photography, and is particularly useful in measuring density to permit the elimination of surface glare from the specularly reflected light on the photograph. In the usual practice, photographs are illuminated and viewed at such angles that the specularly reflected rays are not visible. This is normally accomplished by illuminating the photograph at an angle of about 40° to 50° to a line or axis perpendicular to the surface and viewing along a line normal or perpendicular to the photograph or within a few degrees thereof.

The importance of glare-free photographs is best demonstrated by handing a print to an observer who will normally tilt the print to the best angle to permit glare-free viewing. In certain instances, no matter what angle the print is tilted to, the surface texture is not proper and a considerable amount of specularly reflected light or surface glare is received at the observer's eye along with the diffusely reflected light of the photographic image. This causes a loss in the photographic detail. The present invention concerns a reflection head for use in measurement of diffuse reflection density to permit predetermination and control of surface glare.

Reflection heads for measurement of diffuse reflection density in and of themselves, are old in the art. None of the present day designs provide for uniform irradiation of a regularly shaped sample area larger than that to be read through a full 360° at an angle of 45°. Experience has proven that illumination of samples with light directed along a single azimuth angle and over too small an area will, in many cases, give a difference in density readings. To compensate for this difference, several readings are taken at various azimuth positions and the results averaged. Obviously, the precise location of the reflection head at all azimuth angles on the surface considered was critical if valid results were to be obtained.

The present invention obviates the difficulties experienced with prior art types of reflection heads while providing additional conveniences in the measurement of diffuse reflection density. In the present design, uniform illumination at all azimuth angles with essentially parallel light is provided by means of a plurality of specially mounted lens end lamps permitting greater accuracy in readings. These lights are arranged through a 360° pattern and directed at an angle of about 45° to a line normal to the surface to be considered. A novel aperture plate is provided to permit selective and easy adjustment of the size of the area sampled. A filter wheel having plural filters and a novel mechanical attenuation means is also provided to permit easy adjustment of the diffuse light signal strength. A separate mechanical attenuator is provided for each filter so that once a suitable level of illumination for a given filter is selected, the level will remain unchanged even though different filters may be used.

In the present reflection head, accuracy in the positioning of the reflection head is assured by a novel target arrangement which permits visual positioning over the area selected for viewing. When the reflection head is subsequently depressed for viewing the selected area, the positioning target is automatically retracted from the area to be viewed, permitting the reflection head to be pressed directly against the surface selected. The target may be provided with concentric target rings which correspond in dimension to apertures of diverse size formed in the novel movable aperture plate mentioned briefly above. The aperture plate is appropriately mounted so that one of the apertures may be brought directly into alignment with the optical path of the light to permit selectivity in the cross-sectional area of the diffused light viewed by a photocell mounted in the reflection head. A greater appreciation of the salient features of the present invention can be had by a consideration of the objects achieved and a detailed description made with reference to the accompanying drawings.

It is an object of this invention to provide a new and improved reflection head for accurately measuring diffuse reflection density.

It is a further object of this invention to provide a new and improved reflection head having a plurality of light sources disposed in a uniform circular pattern to provide for uniform illumination of an area considerably larger than the one actually viewed.

It is a further object of this invention to provide a reflection head having means to reduce the cross-sectional area of the light diffused from the area sampled.

It is a still further object of this invention to provide a new and improved reflection head having a positioning target which provides for greater accuracy in locating the reflection head over a selected area to be viewed prior to actual placement of the reflection head on the area viewed.

It is a further object of this invention to provide a reflection head having a positioning target means for use in positioning the reflection head over an area to be viewed with the reflection head also having a novel aperture plate with diverse size of apertures adapted to be selectively positioned in the optical path, the diverse apertures corresponding in dimension to concentric rings on the positioning target.

It is a further object of this invention to provide a reflection head having a rotatable filter wheel provided with variable attenuation means, each of which is independently operable to permit use of one filter without requiring changes in attenuation adjustment of the remaining filters.

Additional objects other than those specifically stated will become apparent on consideration of the drawings and accompanying description.

In the drawings:

FIGURE 1 is a perspective view of the reflection head of the present invention with an amplifier shown at the extreme right on a reduced scale;

FIGURE 2 is a top plan view of the reflection head of FIGURE 1 with the head in the depressed or surface viewing position;

FIGURE 3 is a longitudinal cross-sectional view taken generally along the lines 3—3 of FIGURE 2;

FIGURE 4 is a fragmentary plan view taken generally along the lines 4—4 of FIGURE 3 and illustrating the variable aperture plate in solid lines in one position and in two other positions in phantom lines;

FIGURE 5 is a free-body plan view, with parts in section, of the filter wheel and mechanical attenuator;

FIGURE 6 is a cross-sectional view taken generally along the lines 6—6 of FIGURE 5;

FIGURE 7 is a fragmentary enlarged free-body plan view of the target used in positioning the reflection head with the target shown in solid lines in the position when the reflection head is raised and in phantom lines in the position assumed when the reflection head is lowered for making a density measurement; and FIGURE 8 is a free-body plan view of the light arrangement and holder used in mounting the lights in the reflection head.

Referring now to FIGURE 1, the reflection head assembly is indicated generally by the reference numeral 10 and includes a base 11 and reflection head 12.

The base 11 consists of a pair of upstanding side walls 13 and 14 joined by transverse braces 15 and 16 at the rearward and forward portions of the assembly. The forward brace 16 is provided with an arcuate cut out 17 which permits the underside of the reflection head to be brought into direct contact with the surface under consideration.

A transversely extending shaft 20 projects through a rearward portion of the reflection head 12 mounting it for pivoting movement on the base 11. As seen in FIGURE 2, a spring 21 (shown in phantom) is wound about the pin 20 and has one end 22 held by the reflection head while the opposite end 23 is held by a collar 24 which is fixed to the shaft 20. The spring 21 operates in torsion to maintain the reflection head in the upright position shown in FIGURE 1 in the absence of external forces. The tension on the spring 21 may be adjusted by backing off the set screw 25 carried in the side wall 14 and rotating the end 26 of the shaft 20 in a direction to provide additional tension. If desired, suitable tool pads may be provided on the end 26 of the shaft 20 to facilitate reception of a wrench. When the proper spring tension has been attained, the set screw may be clamped tightly to prevent the shaft 20 from rotating to the base 11.

The reflection head 12 includes a case formed of an upper half 30 and a lower half 31 which are joined to form a housing for the reflection head components. As seen in FIGURES 2 and 3, the lower half 31 of the case is provided with an opening 32 into which is fitted a bushing 33. The bushing 33 is provided with a stepped bore 34 in which is mounted a collimating lens 35. The bore 34 has a geometric axis which is aligned with a light receiving portion of a photocell 36, this axis being coincident with the optical axis, as will become apparent.

The lower part of the bushing 33 is provided with an annular external shoulder 37 for mounting a light source. As seen in the enlarged view of FIGURE 8, the light source includes a metal frusto conical ring 38, mounting a plurality of lamps 40 at equiangular locations around the periphery. Each of the lamps 40 is of conventional design being provided with an integral collimating lens formed in the glass at the inner end. The filament of the lamp is located at the focal point of the collimating lens which may be clear or frosted. The mounting arrangement of the lamps is such that the mounting ring 38 serves as one of the conductors for filament power while the other conductor, completing the circuit to the lamp filaments, comprises a metal ring 41 engaging the lamp bases. This arrangement facilitates easy replaceability of the lamps. The conducting ring 41 and the light mounting ring 38 are connected to a suitable source of power in a conventional manner. These lamps are of low wattage and produce minimum heat which is easily dissipated.

It is to be appreciated that the arrangement of the lamps 40 on the mounting ring 38 is such that they are all directed toward a single concentrated area for maximum uniform sample area illumination. Stated another way, the axes of the lamps are positioned to intersect at a common point in the plane of the diffusing surface under consideration. The optical axis of each of the lamps is arranged at an angle of 45° to the optical and geometric axes of the bore 34. As is apparent in FIGURE 3, when the light mounting ring is inserted over the exterior of the bushing 33 against the shoulder 37, the bases of each of the lamps are disposed in conducting abutment with the conducting ring 41. A lamp cover 42 is joined to the lower half of the housing 31 and engages the lower end of the mounting ring 38 to hold it operatively and removably positioned. The cover 42 is provided with an opening 43 which is of sufficient size to permit illumination and viewing of a greater sample area than that actually measured at the photocell.

The underside 44 of the cover 42 is disposed at right angles to the optical axis to permit the reflection head to be brought into flat engagement with the surface under consideration thereby assuring proper positioning of the optical axis during diffuse density measurement. A filter wheel 50 is mounted above the upper end of the bushing 33 for rotation about an axis 51 which is spaced from the axis of the bore 34. A bearing 52 mounts the filter wheel 50 for rotation while a shaft 53, disposed within the bearing, mounts an aperture plate 54 above the filter wheel.

Referring now to FIGURE 5, the filter wheel 50 is shown in enlarged plan view having portions broken away to illustrate the details of the mechanical attenuators. The filter wheel 50 includes a plurality of openings 55, 56, 57, 58 and 59 arranged around the peripheral portion of the filter wheel 50 on centers located on radii which are spaced at equal angles. In each of the openings 55–59, a suitable filter 60, 61, 62, 63 and 64, respectively, of known type is mounted. A mechanical attenuator 65, 66, 67, 68 and 69, respectively, is also mounted in the filter wheel 50 in such a manner so as to have a part thereof which is movable into and out of the openings 55–59, respectively. Each of the mechanical attenuators is of identical construction and is mounted in the filter wheel 50 in identical manner, acting along an axis forming a part of a chord of the filter wheel 50, so detailed description will be limited only to the mechanical attenuator 68 in the interest of brevity.

The mechanical attenuator 68 consists of a rotatable portion 70 positioned in a bore 71 which has the axis thereof intersecting the geometric axis of the bore 58. A knurled knob 81 is formed at the outer end of the rotatable portion 70, while a cylindrical portion 72 of reduced diameter is formed at the inner end for reception in the bore 71 with a bearing fit. An annular groove 73 is formed in the inner end of the cylindrical portion of reduced diameter 72 in radial alignment with an opening 74 in the filter wheel 50. A set screw 75 extends through the opening into the annular groove 73 fixing the knob portion 70 against axial movement within the longitudinal bore 71, while permitting free rotation. The inner end of the knob portion 71 is threaded as at 76 and threadably receives a split masking sleeve 77. The split in the sleeve 77 is indicated at 78 and accommodates a pin 80 which prevents rotation of the masking sleeve 77 while permitting free reciprocation within the bore 71. As is now apparent, rotation of the knurled end 81 causes the masking sleeve 77 to reciprocate into and out of the bore 58. This effectively limits or attenuates the amount of light passing through the filter 63. Each of the mechanical attenuators 65–69 functions in a similar manner to control the level of light passing through the filter 63. It can be appreciated that the mechanical attenuator may consist of a single threaded piece such as a bolt or thumb screw, however, the two-part attenuator is preferable since the extent of projection of the knob 81 from the periphery of the filter wheel remains constant irrespective of the position of the masking sleeve 77. By the novel mechanical attenuation provided, once a particular light level is set for a given filter, the filter wheel may be moved to use other filters without disturbing the particular setting. Replacement and cleaning of the filters in the filter wheel is easily accomplished as each of the individual filters is mounted in the same manner as the filter 63, that is, in a counterbore at the top of the filter receiving bore.

Referring now to FIGURES 2, 3 and 4, the details of the novel aperture plate will be described. The aperture plate 54 is provided with a knob 82 at the outer end which is of narrow section. As shown in the plan views, the inner end of the aperture plate 54 flares outwardly in a fan shape, terminating in an arcuate end 83 having a plurality of notches 84, 85 and 86, each of which is adapted to receive the end of a spring detent 87 mounted on the upper housing 30 by riveting or the equivalent. The inner end of the aperture plate 54 is provided with apertures 88, 89 and 90 of varying size disposed to have the center of each moved into alignment with the axis of the bore 58 in the filter wheel which, as seen in FIGURE 2, is coaxial with the axis of the bore 34. In this manner, the cross-sectional size of the light beam admitted to the photocell 36 may be selectively controlled, and under existing standards, limited to less than the area actually illuminated. As will be seen, such selection may be made with reference to the novel positioning target which improves the accuracy of positioning of the reflection assembly 10 for greater accuracy in measurement. Obviously, the apertures may vary in size and the number provided depending on requirements.

As seen in FIGURE 3, between the upper end of the bushing 33 and the collimating lens 35 is a vacant space in which a conversion filter may be mounted. It is contemplated that a blue conversion filter may be mounted in this space which will raise the apparent effective temperature of the light from the actual temperature of about 2,870° Kelvin to about 3,000° Kelvin for greater accuracy in certain diffuse measurements. This feature is considered optional, however, the present invention makes provisions for accommodating the same, at the election of the purchaser.

As seen in FIGURE 1, a target arm 91 is mounted for pivoting movement on the base 16 by means of a pin or rivet 92. The target arm 91 is provided with a transparent plastic disc 92 and, as seen in FIGURE 7, includes a plurality of concentric circles 93. The center of each of the circles is coaxial with the axis of the bore 34 and the center of the apertures 88, 89 and 90 in the variable aperture plate 54 when each is positioned in axial alignment with the optical path of the light. As best shown in FIGURE 7, a spring 94 is attached to the target arm 91 urging it in a clockwise direction and bringing a stop 95 up against a pin 96 mounted on the transverse arm base 16. When the reflection head is depressed, a link 97 has an enlarged end formed by jam nuts 98 and 99 engaging a vertically disposed surface 100 on the target arm 91 causing it to move in a counterclockwise direction to the position shown in phantom in FIGURE 7. The rearward end of the link 97 is connected directly to a portion of the reflection head 12 which is disposed rearwardly of the pin 20.

When the reflection head is released, the spring 21 returns it to the upright position and the linkage arm 97 moves forward, permitting the spring 94 to move the target arm 91 to the position shown in solid lines in FIGURES 1 and 7 with the stop 95 engaging the pin 96.

The photocell 36, shown in FIGURE 3, is provided with a suitable conductor 101 which leads to a suitable amplifier shown in FIGURE 1 at 102. It is contemplated that the photocell and amplifier arrangement will be of the type described in Patent No. 2,952,813, Patent No. 2,605,248 or Patent No. 3,260,945. The features of the above patents are incorporated in an electronic densitometer sold under the registered trademark "Densichron" by The Welch Scientific Company and includes a system for magnetically modulating the space current in a phototube. Also available is a probe in which the space current is dually modulated as described in the above patents, this being preferable in this application because of its greater sensitivity. The meter is suitably scaled to provide a logarithmic scale for reading optical density directly. Obviously, the reflection head may be used with equivalent types of amplifiers, however, it is contemplated that best results may be achieved by use of one of the foregoing.

In using the reflection head, the size of the aperture is easily selected by the indicia indicated on the forward part of the top half of the case 30, as shown in FIGURE 1. The variable aperture selected is brought into axial alignment with the bore 34 and the spring detent maintains it so positioned. The reflection head assembly is moved into position so that the correspondingly sized circle 93 on the target disc is positioned over the area to be considered. The amplifier 102 is properly adjusted and the reflection head is moved to a down position as shown in FIGURES 2 and 3. The light from the light sources 40 strikes the diffusing surface at an angle of about 45°, being reflected at an angle of 45° with a portion of the light diffused directly upwardly along the optical axis which is coincidental with the geometric axis of the bore 34. The collimating lens 35 aligns the light rays as they project or pass through the filter 63 through the selected aperture in the aperture plate 54 into the photocell 36. Attenuation is adjusted by adjusting the mechanical attenuator knobs to the proper degree of masking off the bore. Readings may be taken and compared with known standards.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A reflection head for use in measuring diffuse reflection density, said reflection head comprising a housing, a vertical bore in said housing, light source means disposed in said housing and being adapted to emit light toward a diffusing surface at an angle of about 45° to the geometric axis of said bore thereby to cause light to diffuse into said bore along an optical axis, means mounting said reflection head for pivoting movement on a base having an upright position and a lowered position, target means mounted on said base and being disposed in alignment with the diffusing surface to be viewed when the reflection head is in the upright position, and means to automatically move said target means away from the diffusing surface in response to depression of said reflection head whereby said reflection head may be positioned directly over said diffusing surface.

2. The reflection head of claim 1 wherein an aperture plate is provided on said reflection head, said aperture plate having apertures of diverse size arranged at one end thereof and being mounted for movement about an axis spaced from said geometric axis whereby one of said apertures of diverse size may be selectively moved into alignment with said optical axis to limit the cross-sectional area of the light reaching a photocell mounted within said reflection head and in alignment with said optical axis.

3. The reflection head of claim 2 wherein said apertures in said aperture plate correspond in dimension to concentric rings formed on said target means thereby to permit greater accuracy in positioning said reflection head and in defining the area being viewed on said diffusing surface.

4. The reflection head of claim 1 wherein said light source means includes a plurality of lights, said lights being mounted on a frusto conical ring to position the axes thereof for intersection with each other on the diffusing surface to be viewed by said reflection head.

5. The reflection head of claim 1 wherein a photocell is positioned to receive diffused light and means is provided to limit the cross-sectional size of the diffused light viewed by said photocell in said reflection head.

6. A reflection head for use in measuring diffuse reflection density, said reflection head being pivotally mounted on a base for pivoting movement between an upright position and a lowered position and comprising a housing having a generally vertical bore with a generally vertical axis, a plurality of light sources disposed around said bore, each of said light sources being arranged to emit light toward a diffusing surface along an angle of 45° to the geometric axis of said bore whereby diffused light radiated from said diffusing surface at an angle of approximately 90° to said diffusing surface will be received into said bore, a photocell positioned at one end of said bore and adapted to receive light diffused from said diffusing surface, an aperture plate having apertures of diverse size thereon and being mounted for movement within said reflection head about an axis spaced away from said axis of said bore whereby one of said apertures of diverse size may be selectively moved into alignment with said axis of said bore to limit the cross sectional area of the light reaching said photocell through said bore, target means mounted on said base for permitting location of said reflection head over the surface to be viewed by said reflection head, and means to automatically move said target means from said surface to be viewed when said reflection head is moved to said lowered position.

7. The reflection head of claim 6 wherein the apertures in said aperture plate correspond in dimension to concentric rings formed on the target thereby to permit greater accuracy in positioning said reflection head and in defining the area being viewed on said surface by said reflection head.

8. In a reflection head containing lamp means and photocell means operatively disposed with respect to each other adapted for use in measuring diffuse reflection density and which is mounted on a base for pivoting movement between an upright position and a lowered position, the improvement comprising light permeable target means on said base which permits location of said reflection head over the surface to be viewed by said reflection head and means to automatically move said target means from said surface to be viewed when said reflection head is moved to said lowered position.

9. A reflection head for use in measuring diffuse reflection density, said reflection head comprising a housing having a generally vertical bore, a plurality of lamps disposed around said bore in a 360° pattern, each of said lamps having a collimating lens at one end thereof, the collimating lens of each of said lamps being arranged to emit parallel rays of light at an angle of approximately 45° to a diffusing surface whereby only the diffused light radiated from said diffusing surface at an angle of approximately 90° to said diffusing surface will be received in said bore, a photocell positioned at one end of said bore and adapted to receive diffused rays of light passing through said bore from said diffusing surface, and a variable aperture plate having apertures of different size positioned between said lamps and said photocell, said aperture plate being adapted for selectively positioning one of said different sized apertures in the path of said diffused light which is received by said photocell, said different size apertures serving to define the area of the diffused surface viewed by said photocell.

10. A reflection head for use in measuring diffuse reflection density, said reflection head comprising a housing having a generally vertical bore, a plurality of lamps disposed around said bore in a 360° pattern, each of said lamps having a collimating lens at one end thereof, the collimating lens of each of said lamps being arranged to emit parallel rays of light an an angle of approximately 45° to a diffusing surface whereby only the diffused light radiated from said diffused surface at an angle of approximately 90° to said diffused surface will be received in said bore, a photocell positioned at one end of said bore and adapted to receive said diffused rays of light passing through said bore from said diffusing surface, and a filter wheel having a plurality of filters mounted in said housing between said lamps and said photocell for rotation about an axis generally parallel to the axis of said bore whereby anyone of the filters on said filter wheel can be selectively positioned with respect to said bore to filter light rays radiated from said diffusing surface, said filter wheel including an individual and adjustable attenuation means for each of said filters, whereby light passing through any given filter can be attenuated independently of, and without affecting the attenuation adjustment for, any other filter in said filter wheel.

11. The reflection head of claim 10 wherein each of said attenuation means comprises a rotationally mounted shaft which is received in an individual attenuator bore formed in said filter wheel, each of said shafts having a threaded end portion, a threaded masking sleeve being received on the threaded end portion of said shaft, said shaft being axially fixed within said individual attenuator bore and freely rotatable therein, and said masking sleeve being movable along the axis of said bore into a selected variable attenuation position for the filter associated therewith in response to rotational movement of said shaft.

References Cited

UNITED STATES PATENTS

| | | | |
|---|---|---|---|
| 2,146,904 | 2/1939 | McFarlane et al. | 356—204 |
| 1,812,294 | 6/1931 | Hohn | 88—14 X |
| 2,406,166 | 8/1946 | Scott | 88—14 |
| 3,340,764 | 9/1967 | Bergson | 250—222 X |
| 3,244,062 | 4/1966 | Sweet | 250—220 X |

WALTER STOLWEIN, Primary Examiner

U.S. Cl. X.R.

210—217, 222